(12) United States Patent
Philipp et al.

(10) Patent No.: US 11,874,539 B1
(45) Date of Patent: Jan. 16, 2024

(54) PERCEPTION CAMERA WITH ROAD SURFACE GLARE REDUCTION

(71) Applicant: GM GLOBAL TECHNOLOGY OPERATIONS LLC, Detroit, MI (US)

(72) Inventors: Tzvi Philipp, Bet Shemesh (IL); Andrew W. Averhart, Redford, MI (US); Yuri Paskover, Binyamina (IL); Tomer Pe'er, Herzliya (IL)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/863,894

(22) Filed: Jul. 13, 2022

(51) Int. Cl.
*G02F 1/01* (2006.01)
*G02F 1/1335* (2006.01)
*H04N 23/55* (2023.01)
*B60R 11/04* (2006.01)

(52) U.S. Cl.
CPC ...... *G02F 1/0136* (2013.01); *G02F 1/133528* (2013.01); *H04N 23/55* (2023.01); *B60R 11/04* (2013.01)

(58) Field of Classification Search
CPC .................................................. G02F 1/0136
See application file for complete search history.

(56) References Cited

U.S. PATENT DOCUMENTS 10,965,857 B1\* 3/2021 Zeng ...................... H04N 23/45
2019/0045144 A1\* 2/2019 Reed ...................... H04N 23/67

\* cited by examiner

*Primary Examiner* — Edmond C Lau
(74) *Attorney, Agent, or Firm* — Quinn IP Law (57) ABSTRACT

A perception system for a motor vehicle includes a camera with a lens having a field of view and configured to focus incident light from the field of view. The field of view includes a road having a road surface. The perception system also includes an imaging sensor arranged in the camera. The imaging sensor has a photosensitive surface defined by an imaging surface area configured to capture the incident light focused from the field of view. A first portion of the imaging surface area is configured to capture an image of the road. The perception system further includes a first polarizer array arranged across the first portion of the imaging surface area and configured to reduce glare from the road surface.

14 Claims, 5 Drawing Sheets

PERCEPTION CAMERA WITH ROAD SURFACE GLARE REDUCTION

INTRODUCTION

The present disclosure relates to a perception camera system for a motor vehicle with road surface glare reduction.

A camera is an optical instrument that captures a visual image. A camera generally includes a sealed camera body with a small aperture that admits light inside the body to capture an image on a photosensitive surface, such as a photographic film or a digital sensor. The aperture may be narrowed or widened to control the amount of light coming in. A typical camera also has a mechanism to control how the light falls onto the photosensitive surface. Cameras generally also have lenses to focus the light entering the camera body. A shutter mechanism is generally provided for determining the amount of time the photosensitive surface is exposed to light.

Some modern motor vehicles employ camera systems with a display for the vehicle operator's perception of surrounding environment when the vehicle is stationary or in motion. Vehicle camera systems generally arrange the camera itself on an external vehicle body surface and position the display inside the vehicle passenger compartment. Such camera systems may also interface with the vehicle's electronic controller, such as a central processing unit (CPU) and be used to facilitate autonomous or semi-autonomous functionality for vehicles. When mounted to a vehicle, the camera may image a road surface, as well as objects in its field of view, and thus be subjected to unwanted reflections off the road surface.

SUMMARY

A perception system for a motor vehicle includes a camera with a lens having a field of view (FOV) configured to focus incident light from the FOV. The field of view includes a road having a road surface. The perception system also includes an imaging sensor arranged in the camera. The imaging sensor has a photosensitive surface defined by an imaging surface area configured to capture the incident light focused from the FOV. A first portion of the imaging surface area is configured to capture an image of the road. The perception system further includes a first polarizer array arranged across the first portion of the imaging surface area and configured to reduce glare from the road surface.

Each polarizer of the first polarizer array may be mounted to a predetermined region of the first portion of the imaging surface area.

Each polarizer of the first polarizer array may be a fixed orientation polarizer.

The perception camera system may additionally include an electronically controlled liquid crystal (LC) array and a second polarizer array having a plurality of polarizers. Additionally, each polarizer of the first polarizer array and the second polarizer array may have a fixed polarization orientation. In such an embodiment, the LC array may be arranged between the first polarizer array and the second polarizer array and configured to introduce a selected phase change to the incident light focused from the FOV and passed through the LC array to further reduce glare from the road surface.

The polarization elements of each of the first polarizer array and the second polarizer array may cover half the imaging surface area to thereby limit optical losses from the first and second polarizer arrays and maintain glare reduction via regulating polarization transmission of select pixels in the LC array.

The perception camera system may additionally include an electronic controller configured to regulate voltage across the LC array to adjust polarization of the incident light focused from the FOV.

The imaging surface area may additionally include a second portion configured to capture an image excluding the road. Additionally, the first polarizer array may be incorporated into an overlay element having a clear section arranged on the second portion of the imaging surface area, such that the overlay element is characterized by a uniform thickness across the imaging surface.

Each of the first polarizer array, the second polarizer array, and the LC array may be arranged across each of the first and second portions of the imaging surface area.

The electronic controller may be additionally configured to regulate voltage across each of the plurality of LCs to adjust polarization of the incident light focused from the FOV onto each of the first and second portions of the imaging surface area in correlation with the FOV.

Also disclosed is a motor vehicle having such a perception camera system. The perception camera system may be mounted to a body of the vehicle and be configured to capture an image of a terrain external to the vehicle body.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
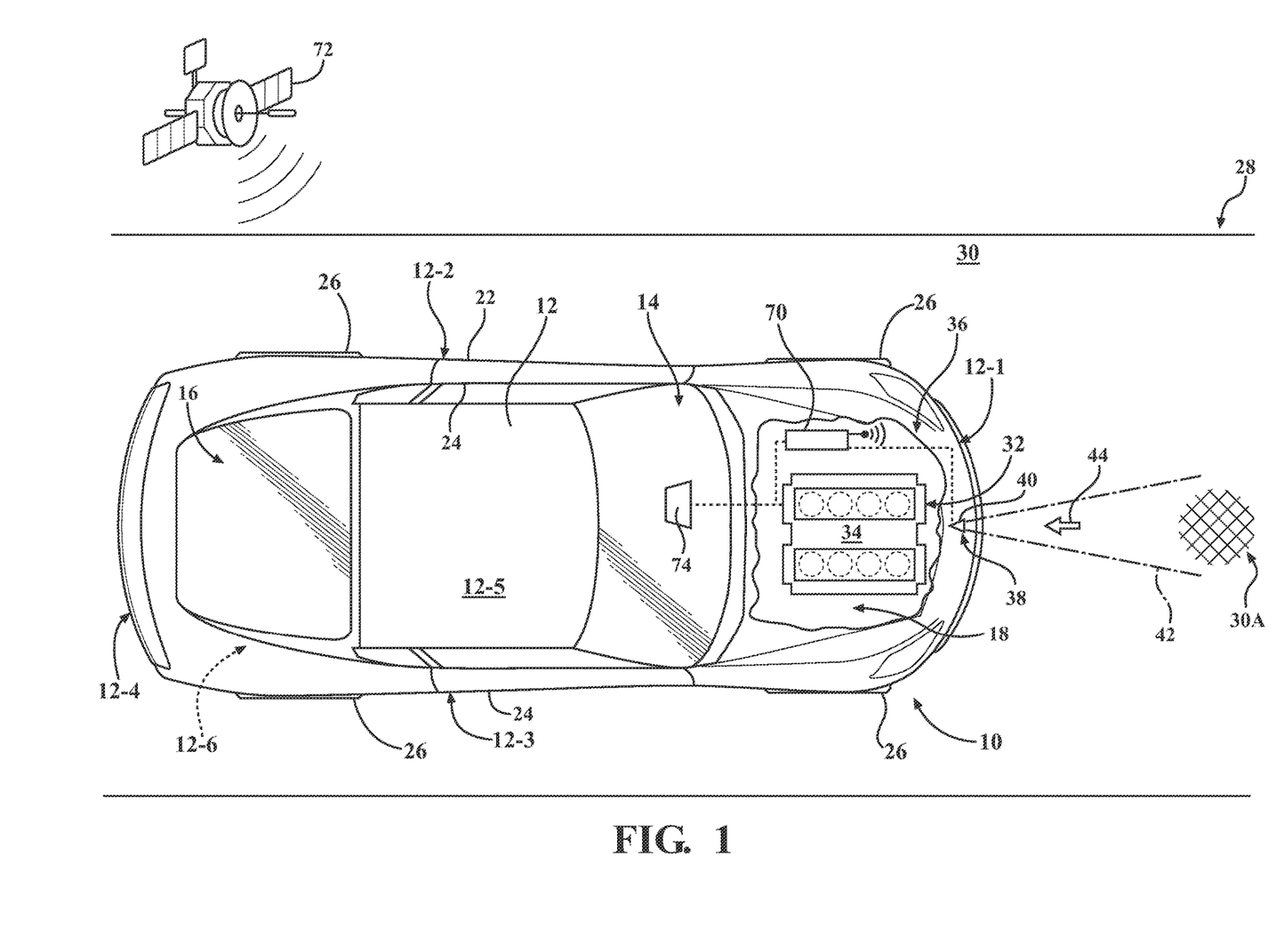
FIG. 1 is a plan view of a motor vehicle having a perception system employing a camera mounted to the vehicle body, with the vehicle arranged on road surface relative to a terrain, and the camera receiving incident light from a field of view (FOV), according to the present disclosure.

Referring to the drawings, wherein like reference numbers refer to like components, FIG. 1 shows a schematic view of a motor vehicle 10, which includes a vehicle body 12. As shown, the vehicle body 12 may have a leading side or front end 12-1, a left body side 12-2, right body side 12-3, a trailing side or back end 12-4, a top side or section, such as a roof 12-5, and a bottom side or undercarriage 12-6. The body sides 12-1 through 12-6 generally define and enclose an interior compartment, such as a passenger compartment 14, a cargo compartment 16, and a powertrain compartment 18. The body sides 12-2, 12-3 may include respective doors 22, 24 configured to provide access to the interior compartment from an environment external to the vehicle body 12.

The vehicle 10 may include a plurality of road wheels 26. Although four wheels 26 are shown in FIG. 1, a vehicle with fewer or greater number of wheels, or having other means, such as tracks (not shown) for traversing a terrain 28, including a road 30, is also envisioned. The vehicle 10 also includes a powertrain 32 generally situated inside the powertrain compartment 18. The powertrain 32 includes a power-plant 34, such as an internal combustion engine (shown) and/or a traction motor (not shown), for generating on-demand power-plant torque. The powertrain 32 may also include a transmission (not shown) operatively connecting the power-plant 34 to at least some of the road wheels 26 for transmitting power-plant torque thereto and thereby putting the vehicle 10 in motion.

Figure 2:
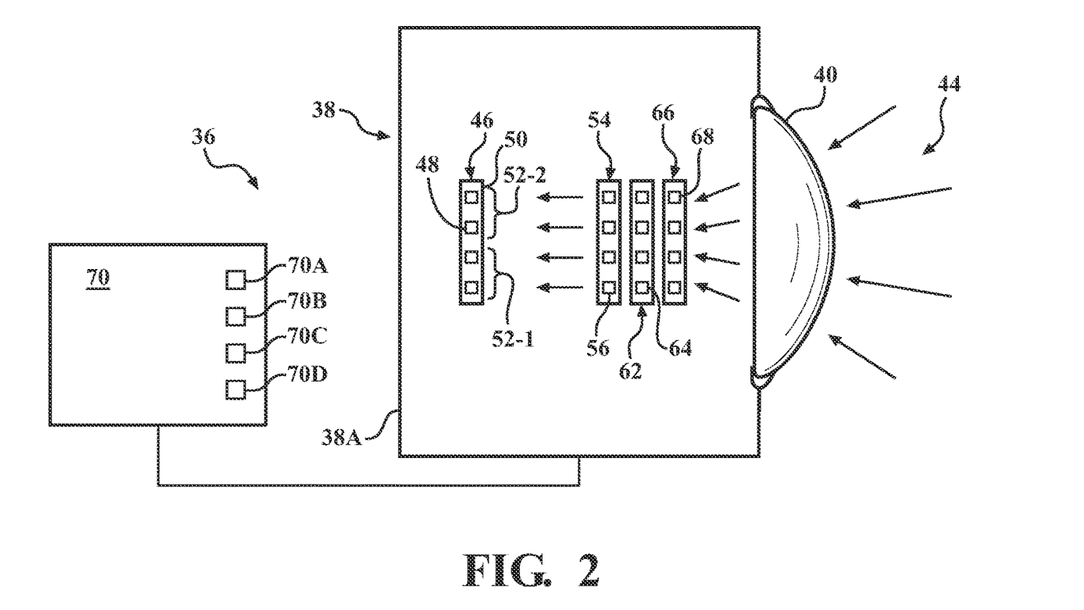
FIG. 2 is an enlarged schematic side view of the perception system shown in FIG. 1, including a camera imaging sensor and optical polarization filters for reduction of glare from the road surface in the FOV, according to the present disclosure.
Figure 3:
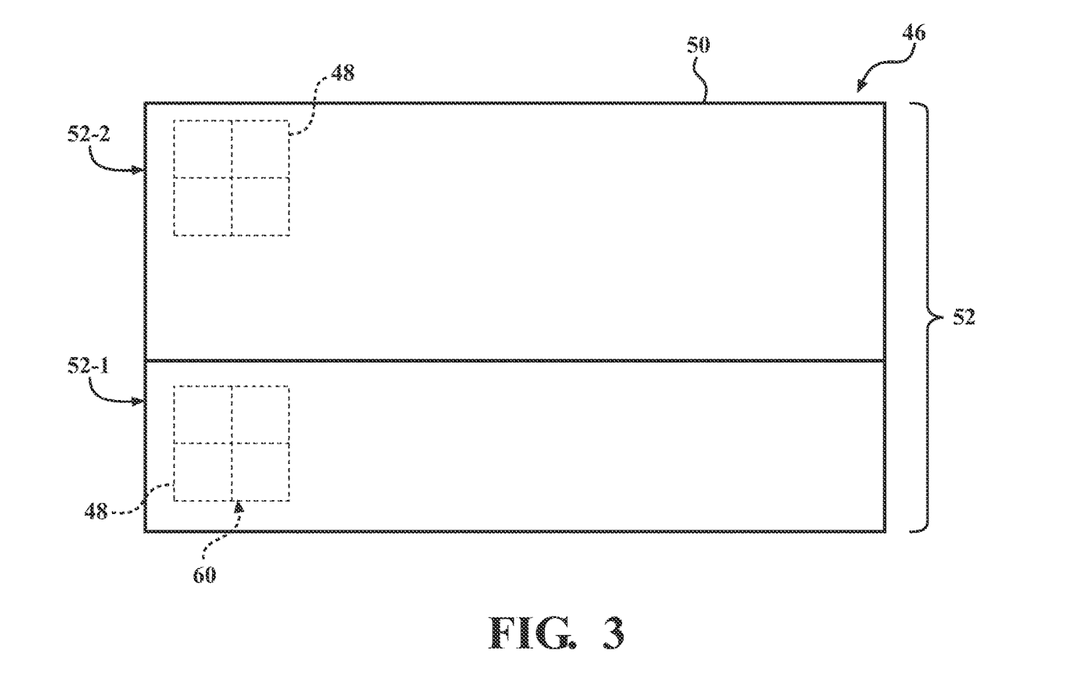
FIG. 3 is an enlarged schematic front view of an embodiment of the camera imaging sensor shown in FIG. 2, illustrating the imaging sensor's surface area having a first portion configured to capture an image of the road and a second portion configured to capture an image of the terrain excluding the road.

As shown in FIG. 1, the vehicle 10 also includes a perception system 36 with a camera 38. The camera 38 is packaged within a housing 38A and mounted to the vehicle body 12. The camera 38 is configured to capture and map images from a selected field of view (FOV) 42 in the terrain 28. The camera 38 includes an optical lens 40 (shown in FIGS. 1 and 2), i.e., arranged therein, having the FOV 42 and configured to focus light 44 incident from the FOV. With respect to the present disclosure, and as shown in FIG. 1, the subject FOV 42 includes the road 30 characterized by a road surface 30A, as well as the rest of the terrain 28 and various objects thereon. As shown in FIGS. 2 and 3, the camera 38 also includes a digital imaging sensor 46 having a plurality of pixels 48. The sensor 46 includes a light- or photo-sensitive surface 50 defined by an imaging surface area or region 52. The imaging sensor 46 may be monochromatic or one having enhanced spectral sensitivity. The imaging surface area 52 is configured to capture the light 44 focused from the FOV 42. The lens 40 is thereby configured to map the FOV 42 onto the imaging sensor 46. As shown in FIG. 3, the imaging surface area 52 includes a first portion 52-1 configured to capture an image of the road 30 and a second portion 52-2 configured to capture an image of the terrain 28 excluding the road, e.g., above the road surface 30A.

Figure 4:
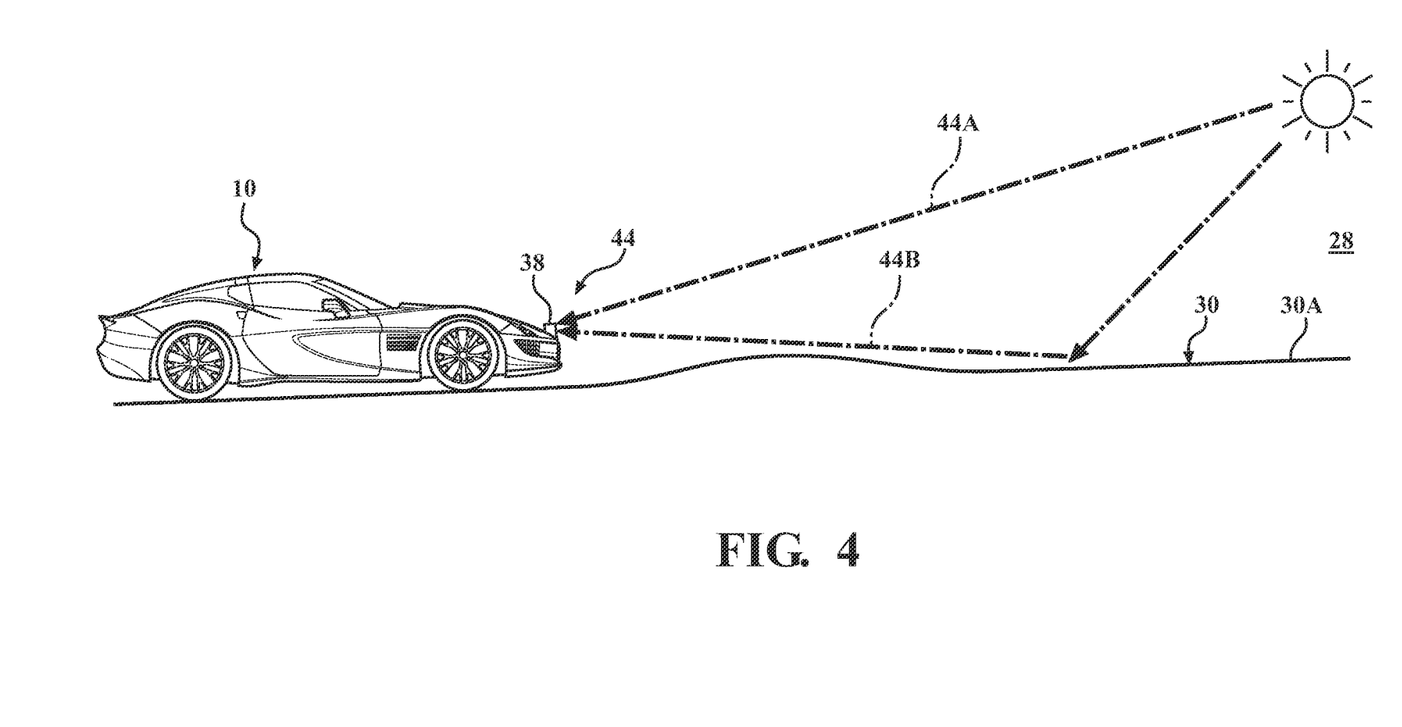
FIG. 4 is a schematic side view of the motor vehicle shown in FIG. 1 situated with respect to the road surface, depicting the camera receiving reflections off the road surface along with direct incident light from the FOV.

In certain conditions, the road surface 30A may create significant reflections from direct and indirect illumination, such as from sunlight, streetlights, and headlamps of oncoming vehicles. As shown in FIG. 4, light received directly from the source, such as sunlight, is generally circularly polarized, indicated as component 44A, while reflected light, such as by the road surface 30A, is predominantly linear s-polarized, indicated as component 44B. In some cases, reflected light may saturate regions in images captured by vehicle cameras. Even when using digital imaging sensors with high dynamic range (HDR), the saturated image will have a reduced dynamic range, resulting in low contrast mapped images that, for example, may impair the function of image processing algorithms. Generally, vehicle geometry, camera design, and camera mounting location dictate the region on the imaging sensors where the road is captured or mapped. Accordingly, position and size of the first portion 52-1 of the imaging surface area 52 may be determined empirically through real-world testing or virtually, e.g., via computer added design (CAD) tools.

With resumed reference to FIG. 2, the perception system 36 also includes a first polarizer array 54 or filter arranged across, e.g., mounted to, the first portion 52-1 of the imaging surface area 52 and configured to reduce glare from the road surface 30A. The first polarizer array 54 may include a plurality of individual polarization elements or polarizers 56 configured to selectively block particular region(s) of the imaging sensor 46. Each polarization element 56 of the first polarizer array 54 may be a fixed orientation polarizer. As such, the first polarizer array 54 may be a filter configured to, for example, block an s-polarized component 44A of the incident light 44 in the visible spectral range and transmit a p-polarized component 44B of the incident light in the visible spectral range. As generally understood, p-polarized light has an electric field direction parallel to the plane of incidence on a device, and s-polarized light has the electric field oriented perpendicular to that plane. The first polarizer array 54 is specifically configured to support the visible spectral range over an angle of incidence of light corresponding to the selected FOV 42, while maintaining its polarization selective behavior.

In addition to the example above, it is also possible to orient the incident light 44 in p-polarization and then orient the light in s-polarization, in p-polarization and then in p-polarization, or in s-polarization and then in s-polarization. Generally, a change in orientation from s-polarization to p-polarization or p-polarization to s-polarization affects a 90-degree phase shift, while maximum attenuation would be achieved with a 180-degree phase shift. An additional intermediate device, such as a liquid crystal (to be discussed in detail below), may be employed to introduce an alternate phase shift to the incident light 44. Such an intermediate device may be used to introduce no phase shift to transmit light and a 90-degree shift to block the light. Alternate orientation values may also be used to impart desired attenuation to transmitted incident light 44.

Figure 5:
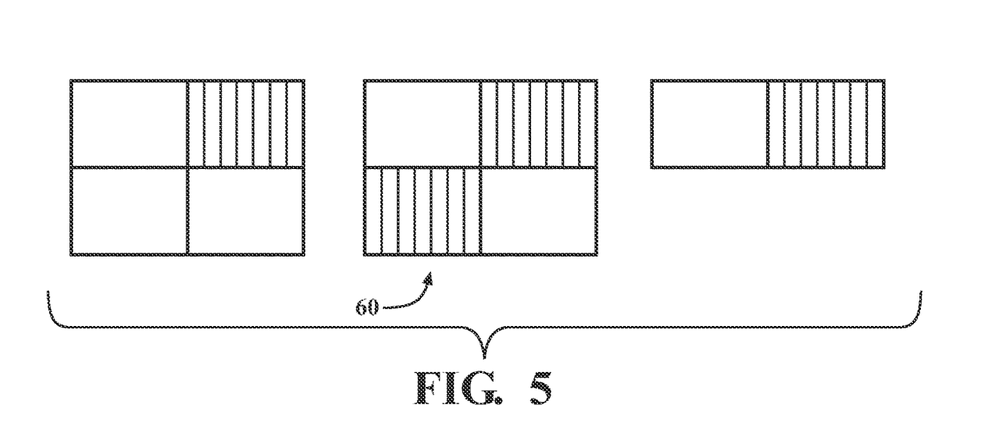
FIG. 5 is a schematic front view of exemplary embodiments of a super pixel, according to the present disclosure.

Each polarizer 56 may be mounted to a predetermined region of the first portion 52-1 of the imaging surface area 52 and include one pixel 58 or a plurality of such pixels. The imaging sensor 46 may have variable pixel density, i.e., have a selectable quantity or grouping of pixels 48. For example, each polarizer 56 may include a super pixel 58A having a fixed aggregation of pixels 58A together configured to overlay the selected grouping of pixels 48. Three nonlimiting examples of the super pixel 60 are shown in FIG. 5 and one embodiment of the super pixel is illustrated in an isometric view in FIG. 6. Additionally, at least one polarizer 56 of the first polarizer array 54 may have a variable polarization orientation or angle across the first portion 52-1 of the imaging surface area 52 and capture effects due to compound angles involved, but otherwise fixedly mounted to the first portion 52-1. Such a variable polarizer 56 may, for example, be manufactured by a lithographic deposition process.

With reference to FIG. 2, the perception system 36 may also include an electronically controlled liquid crystal (LC) array 62 having a plurality of individual LCs 64 (LC cells). In general, regulation of voltage across individual LCs 64 changes the alignment of the constituent liquid crystal molecules, which changes the phase of the incident light 44 passing through the LC array 62. The voltage across individual LCs 64 may be controlled "per pixel" of the imaging sensor surface area 52. Specifically, the pixels of the LCs 64 arranged over the imaging sensor surface area 52 being used optically and which need to be turned on and off may be connected via an optically transmissive yet electrically conductive coating, such as via Indium Tin Oxide (ITO).

Figure 6:
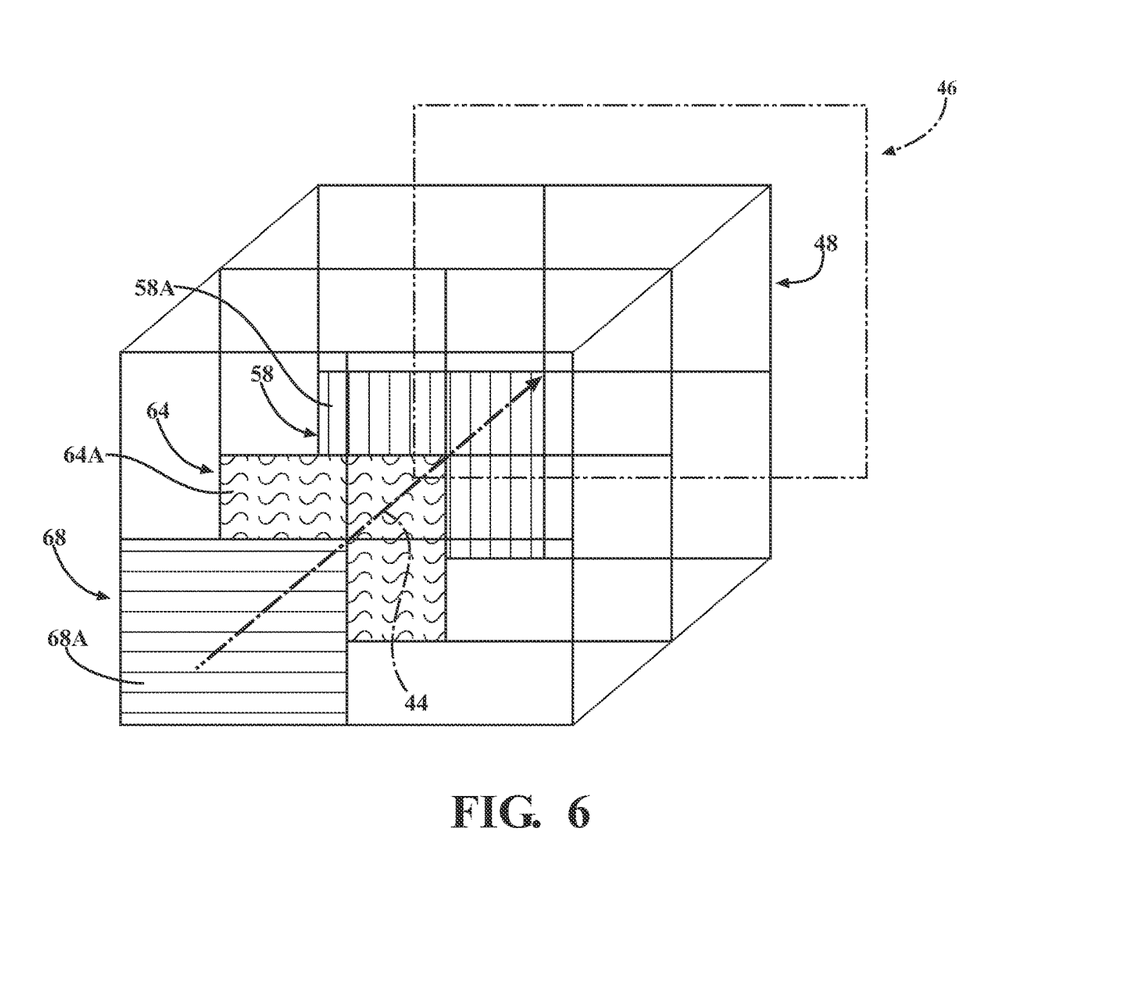
FIG. 6 is a schematic isometric view of a path of incident light through super pixels in optical polarization filters arranged relative to the camera imaging sensor, according to the present disclosure.

Once the electrically conductive coating is applied, a laser may be used to strip off regions of the coating to create electrically conducting "lanes" that are isolated from neighboring areas. Although the width/thickness of the coating directly affects the electrical losses vs. transmission of the voltage signal, greater optical transmission is highly desirable. For this reason, as shown in FIG. 6, the LC array 62 may employ super pixels 64A, e.g., having a fixed high-density aggregation of pixels 58, to be turned on and off as pixel blocks. The amount of voltage needed to activate LCs 64 would be enough to cause an LC molecule to rotate 90 degrees, which will depend upon the thickness of the specific LC cell. The value of the voltage signal may be in a range of 0-30 volts and may also depend on the modulation frequency of the signal.

The perception system 36 may additionally include a second polarizer array 66 having a plurality of polarizers 68. The second polarizer array 66 may employ super pixels 68A to be turned on and off as pixel blocks, as illustrated in FIG. 6. As shown in FIG. 2, the LC array 62 may be arranged between the first polarizer array 54 and the second polarizer array 66. In other words, the second polarizer array 66, the LC array 62, and the first polarizer array 54 may be arranged sequentially relative to the path of the light 44 incident from the FOV 42, i.e., one after the other with respect to the optical flow. In such an embodiment, each polarizer of the first polarizer array 54 and each polarizer of the second polarizer array 66 may have a fixed polarization orientation or angle.

Arranged, as described above, between the first and second polarizer arrays 54, 66, the LC array 62 may introduce a phase change or shift to the incident light 44 focused from the FOV 42 and passed therethrough selected to further reduce glare from the road surface 30A. The polarization elements 56 of the first polarizer array 54 and the polarization elements 68 of the second polarizer array 66 may be arranged such that each respective array covers half the imaging surface area 52. Thus arranged, polarization elements 56, 68 limit optical losses from the first and second polarizer arrays 54, 66 and maintain glare reduction via regulation of polarization transmission of select pixels in the LC array 62. Covering half the imaging surface area 52 is intended to achieve an effective balance between amount of incident light lost due to filtering and the amount to be mapped onto the sensor 46.

Generally, a polarizer will reduce the amount of light transmitted through it by 50% when the incident light is circularly polarized. This effect is in addition to the naturally occurring losses dues to absorption and reflection by the polarizer's material. Since the incident light is made up of two vectors orthogonal to each other, by placing the polarizer on one of the axes, a single vector will pass through. Therefore, relative to unfiltered pixels, the light loss will be approximately 50%. However, even though 50% of the light will be lost, because the polarization state is filtered to one specifically defined orientation, the remaining light may be further manipulated as needed. Therefore, despite 50% of the light being lost due to placement of the first and second polarizer arrays 54, 66 in the region where the road surface 30A is mapped to (the first portion 52-1), the benefit of the reduced glare outweighs the detriment to the overall quality of the mapped image.

With resumed reference to FIGS. 1 and 2, the perception system 36 may further include an electronic controller 70. The electronic controller 70 may alternatively be referred to as a control module, a control unit, a controller, a vehicle 10 controller, a computer, etc. The electronic controller 70 may be employed for regulating operation of the motor vehicle 10, such as to enable the vehicle's autonomous or semi-autonomous operation. Additionally, as shown in FIG. 2, the electronic controller 70 may be operatively connected to the first polarizer array 54 having polarizer(s) 56 and/or the electronically controlled LC array 62. As shown in FIG. 1, the electronic controller 70 may include a computer and/or processor 70A, and include software, hardware, memory, algorithms, connections, etc., for managing and controlling operation of various systems and functions of the vehicle 10.

The electronic controller 70 may be embodied as one or multiple digital computers or host machines each having one or more processors 70B, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile.

Non-volatile media may include, for example, optical or magnetic disks and other persistent memory. Example volatile media may include dynamic random-access memory (DRAM), which may constitute a main memory. Other examples of embodiments for memory include a flexible disk or hard disk, magnetic tape or other magnetic medium, a CD-ROM, DVD, and/or other optical medium, as well as other possible memory devices such as flash memory. The electronic controller 70 also includes a tangible, non-transitory memory 70C (shown in FIG. 1) on which computer-executable instructions, including one or more algorithms, for regulating operation of the motor vehicle 10 are recorded. Algorithms required by the controller 70 or accessible thereby may be stored in the memory and automatically executed to provide the required functionality.

As shown in FIG. 1, the electronic controller 70 may, for example, be in wireless communication with a global positioning satellite (GPS) 72, such as via a vehicle navigation system 74 arranged inside the vehicle passenger compartment 14. The electronic controller 70 may receive images obtained via the perception system 36 and use such images along with the data received from the GPS in a perception, e.g., image processing and recognition, algorithm to assess position of the vehicle 10 relative to the terrain being traversed thereby in real time, as well as classify, identify, and localize objects captured in the FOV' s. Thus assessed, the position of the vehicle 10, along with the objects data, may be employed to navigate the vehicle across the terrain with or without operator input. As such, regulation of the perception system 36, and specifically the camera 38, may be embodied in a program or algorithm operable on the electronic controller 70.

As shown in FIG. 2, the above-mentioned algorithm(s) of the electronic controller 70 may include an algorithm 70D for regulating operation of the perception system 36, for example to assist autonomous or semi-autonomous operation of the motor vehicle 10. Specifically, the electronic controller 70 may regulate, via the algorithm 70D, polarization orientation across the first portion 52-1 of the imaging surface area 52 by regulating the voltage across the LCs 64 to vary the phase of the polarizer(s) 56 in the first polarizer array 54. Specifically, the electronic controller 70 may be configured to adjust voltage across the LC array 62, e.g., across each individual LC 64, in response to positioning of the camera 38 relative to the terrain 28 and the resultant mapped FOV 42. A specifically polarized first polarizer array 54 positioned aft of the voltage-controlled LC array 62 will then transmit the component of the light 44 that is aligned with its polarization and reflect other light components.

Accordingly, the second polarizer array 66 may be used to select one of the two possible linear polarization states for the incident light 44 focused in from the lens 40 and pass the linearly polarized light to the LC array 62. The LC array 62 may then be used to introduce a phase change to the polarized light received from the second polarizer array 66, which effectively rotates the residual polarization orientation relative to the second polarizer array. The incident light aft of the LC array 62, in the rotated state, is then passed into the first polarizer array 54. If the LC array 62 and the first polarizer array 54 are coaligned, then the remaining 50% of the polarized light is passed through. On the other hand, if the LC array 62 and the first polarizer array 54 are phase misaligned, less than 50% of light is passed through to the imaging sensor surface 52 of the sensor 46, i.e., the incident light 44 is subjected to further attenuation.

Consequently, varying of the voltage across the LC array 62 is intended to adjust polarization (attenuation) of the incident light 44 focused from the FOV 42 into the second polarizer array 66, through the LC array 62, then through the first polarizer array 54 and then mapped onto the imaging surface area 50. As a result, the polarized incident light 44 mapped onto each of the first and second portions 52-1, 52-2 of the imaging surface area 50 is accomplished in correlation with the angle/orientation of the camera 38 and the resultant FOV 42. Accordingly, the electronic controller 70 may be configured or programmed to enable the camera 38 to capture an image of the terrain 28 in the FOV 42, while reducing glare from the road surface 30A.

The electronic controller 70 may be programmed to dynamically regulate the LC array 62 in response to feedback signal(s) from existing functions of the camera 38. For example, automatic gain control (AGC) of the camera 38 may be used. Typically, the AGC functions to keep the overall exposure of the image balanced between the lowest detectable signal to the highest (brightest) to avoid saturation of the signal (a signal greater in value than the A/D can read out). Alternatively, a signal may be used from the camera's backlight compensation (BLC) feature controlling light distribution over the scene images (depending upon the lighting scene, since a distant bright light source may drown out a closer object that is darker). Additionally, camera's highlight compensation (HLC) function used to prevent localized bright sources (such as headlamps) from overcompensating the overall balance of the image may be employed for feedback control. Such feedback control may be in response to identified saturation level of the pixels 48 and the location of the saturated pixels, such as by cartesian coordinates, on the photo-sensitive surface 50.

The regulation of the LC array 62 may be operated in a closed loop process to generate a captured image frame through a selected combination of AGC, BLC, and HLC, or other camera-based algorithms. The feedback to such algorithms (besides the traditional variables like exposure time, image gain, and offset) would include an additional polarization tuning parameter. For example, a captured image could have regions that are saturated (pixels having a digital value greater than 255 in an 8-bit sensor). In such a scenario, provided the algorithm had already converged on an appropriate exposure time and gain setting for the image, the number of saturated pixels in the imaging sensor 46 may be significant, especially if they form a contiguous region in the image. Therefore, the polarization of the sensor pixels in the saturated region may be used as an additional attenuation factor for image acquisition and may be tuned to decrease the imaging signal, i.e., the incident light 44 focused from the FOV 42, by a polarization ratio factor. The subject polarization ratio factor is related to the polarization ratio of the two polarization filters, the first and second polarizer arrays 54, 66, typically between 1:200 and 1:10,000 in the imaging sensor 46, as well as a factor by which the phase may be adjusted in the LCs 64. Such control may be applied pixel wise or super pixelwise rather than over the entire image. In other words, the relative phase of each pixel in the LCs 64 may be controlled via adjustment of the voltage across the specific region in the LC array 62.

Figure 7:
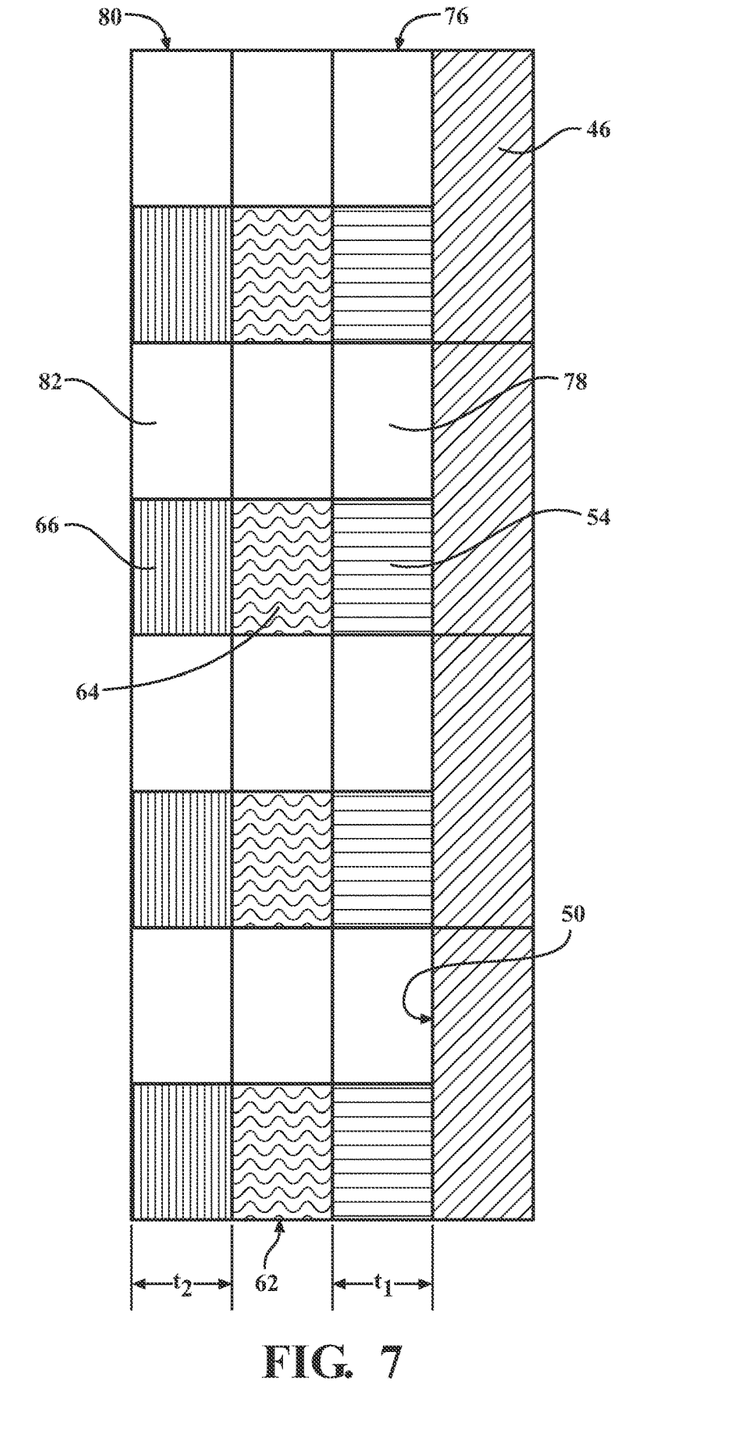
FIG. 7 is an enlarged schematic side view of the optical polarization filters arranged relative to the camera imaging sensor shown in FIG. 2, including polarizer and liquid crystal arrays incorporated into corresponding overlay elements having non-polarizing clear sections and respective substantially uniform thicknesses, according to the present disclosure.

As shown in FIG. 7, the first polarizer array 54 may be incorporated into a corresponding first overlay element 76 having a clear (non-polarizing) section 78 arranged on or covering the second portion 52-2 of the imaging surface 50. Each of the first polarizer array 54 and the clear section 78 may have a substantially uniform thickness $t_1$. Thus constructed, the overlay element 76 may be characterized by a uniform thickness $t_1$ relative to and across the imaging surface 50. Analogously, the second polarizer array 66 may be incorporated into a corresponding second overlay element 80 having a clear section 82 arranged alongside or parallel to the second portion 52-2 of the imaging surface 50. Each of the second polarizer array 66 and the clear section 82 may have a substantially uniform thickness $t_2$. As a result, the entire overlay element 80 may be characterized by a uniform thickness $t_2$ relative to the sensor imaging surface 50. The LC array 62 may have analogous construction with clear section(s) for a generally uniform thickness of the resultant polarization filter assembly. As illustrated in FIG. 7, such a polarization filter assembly with each of the first overlay element 76 having the first polarizer array 54, the LC array 62, and the second overlay element 80 having the second polarizer array 66 may be arranged upstream of the imaging surface 50.

Overall, the perception system 36 includes a combination of polarization optical elements, some of which may be electronically controlled, incorporated into the motor vehicle mounted camera to provide a mapped image with minimized glare from a road surface within a selected FOV. The polarization optical elements of the perception system 36 are generally stationary relative to camera's lens and imaging sensor, and thus require no separate moving components or mechanical actuation to permit the camera to capture a desired FOV with reduced glare. The perception system 36 may additionally include liquid crystal optical elements regulated via an onboard electronic controller to further attenuate glare from a road surface within the selected FOV and support generation of high contrast images for image processing algorithms.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A perception system for a motor vehicle having a camera, the perception system comprising: a lens having a field of view (FOV), arranged in the camera, and configured to focus incident light from the FOV, wherein the FOV includes a road having a road surface; an imaging sensor arranged in the camera and having a photosensitive surface defined by an imaging surface area configured to capture the incident light focused from the FOV, including a first portion of the imaging surface area configured to capture an image of the road; and a first polarizer array having a plurality of fixed orientation polarizers arranged across the first portion of the imaging surface area and configured to reduce glare from the road surface, wherein each polarizer of the first polarizer array is mounted to a predetermined region of the first portion of the imaging surface area; a second polarizer array having a plurality of fixed orientation polarizers; and an electronically controlled liquid crystal (LC) array arranged between the first polarizer array and the second polarizer array and configured to introduce a selected phase change to the incident light focused from the FOV and passed through the LC array to further reduce glare from the road surface.

2. The perception system according to claim 1, wherein polarization elements of each of the first polarizer array and the second polarizer array cover half the imaging surface area to thereby limit optical losses from the first and second polarizer arrays and maintain glare reduction via regulating polarization transmission of select pixels in the LC array.

3. The perception system according to claim 1, further comprising an electronic controller configured to regulate voltage across the LC array to adjust polarization of the incident light focused from the FOV.

4. The perception system according to claim 1, wherein the imaging surface area additionally includes a second portion configured to capture an image excluding the road, and wherein the first polarizer array is incorporated into an overlay element having a clear section arranged on the second portion of the imaging surface area, such that the overlay element is characterized by a uniform thickness across the imaging surface.

5. The perception system according to claim 4, wherein each of the first polarizer array, the second polarizer array, and the LC array is arranged across each of the first and second portions of the imaging surface area.

6. The perception system according to claim 5, wherein the electronic controller is additionally configured to regulate voltage across each of the plurality of LCs to adjust polarization of the incident light focused from the FOV onto each of the first and second portions of the imaging surface area in correlation with the FOV.

7. A motor vehicle comprising: a vehicle body; and a perception system mounted to the vehicle body and having a camera configured to capture an image of a terrain external to the vehicle body, including a lens having a field of view (FOV) including the terrain, arranged in the camera, and configured to focus incident light from the FOV, wherein the FOV includes a road having a road surface; an imaging sensor having a photosensitive surface defined by an imaging surface area configured to capture the incident light focused from the FOV, including a first portion of the imaging surface area configured to capture an image of the road; and a first polarizer array having a plurality of fixed orientation polarizers arranged across the first portion of the imaging surface area and configured to reduce glare from the road surface in the perception camera, wherein each polarizer of the first polarizer array is mounted to a predetermined region of the first portion of the imaging surface area a second polarizer array having a plurality of fixed orientation polarizers; and an electronically controlled liquid crystal (LC) array arranged between the first polarizer array and the second polarizer array and configured to introduce a selected phase change to the incident light focused from the FOV and passed through the LC array to further reduce glare from the road surface.

8. The motor vehicle according to claim 7, wherein polarization elements of each of the first polarizer array and the second polarizer array cover half the imaging surface area to thereby limit optical losses from the first and second polarizer arrays and maintain glare reduction via regulating polarization transmission of select pixels in the LC array.

9. The motor vehicle according to claim 7, wherein the perception system additionally includes an electronic controller configured to regulate voltage across the LC array and thereby adjust polarization of the incident light focused from the FOV.

10. The motor vehicle according to claim 7, wherein the imaging surface area additionally includes a second portion configured to capture an image excluding the road, and wherein the first polarizer array is incorporated into an overlay element having a clear section arranged on the second portion of the imaging surface area, such that the overlay element is characterized by a uniform thickness across the imaging surface.

11. The motor vehicle according to claim 10, wherein each of the first polarizer array, the second polarizer array, and the LC array is arranged across each of the first and second portions of the imaging surface area.

12. The motor vehicle according to claim 11, wherein the electronic controller is additionally configured to regulate voltage across each of the plurality of LCs to adjust polarization of the incident light focused from the FOV onto each of the first and second portions of the imaging surface area in correlation with the FOV.

13. A perception system for a motor vehicle having a camera, the perception system comprising: a lens having a field of view (FOV), arranged in the camera, and configured to focus incident light from the FOV, wherein the FOV includes a road having a road surface; an imaging sensor arranged in the camera and having a photosensitive surface defined by an imaging surface area configured to capture the incident light focused from the FOV, including a first portion of the imaging surface area configured to capture an image of the road; and a first polarizer array having a plurality of fixed orientation polarizers arranged across the first portion of the imaging surface area and configured to reduce glare from the road surface; a second polarizer array having a plurality of fixed orientation polarizers; and an electronically controlled liquid crystal (LC) array arranged between the first polarizer array and the second polarizer array and configured to introduce a selected phase change to the incident light focused from the FOV and passed through the LC array to further reduce glare from the road surface.

14. The perception system according to claim 13, further comprising an electronic controller configured to regulate voltage across the LC array to adjust polarization of the incident light focused from the FOV.

\* \* \* \* \*